US010008856B2

(12) United States Patent
Pan et al.

(10) Patent No.: US 10,008,856 B2
(45) Date of Patent: Jun. 26, 2018

(54) POWER SYSTEM FOR OFFSHORE APPLICATIONS

(71) Applicant: GENERAL ELECTRIC COMPANY, Schenectady, NY (US)

(72) Inventors: Yan Pan, Niskayuna, NY (US); Martin Samuel Butcher, Rugby (GB); Dong Dong, Schenectady, NY (US); Martin Richard Ingles, Coventry (GB); Christof Martin Sihler, Karlsruhe (GB); Ara Panosyan, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 303 days.

(21) Appl. No.: 14/935,725

(22) Filed: Nov. 9, 2015

(65) Prior Publication Data
US 2017/0133858 A1 May 11, 2017

(51) Int. Cl.
*H02J 5/00* (2016.01)
*H02J 3/38* (2006.01)
(Continued)

(52) U.S. Cl.
CPC ............. *H02J 3/386* (2013.01); *H02J 3/36* (2013.01); *H02J 5/00* (2013.01); *H02M 3/04* (2013.01); *H02M 7/04* (2013.01)

(58) Field of Classification Search
CPC .................................................. H20J 5/00
(Continued)

(56) References Cited

U.S. PATENT DOCUMENTS 5,781,419 A * 7/1998 Kutkut .............. H02M 3/33569
363/132
6,243,277 B1 * 6/2001 Sun .......................... H02J 7/34
323/222
(Continued)

FOREIGN PATENT DOCUMENTS

EP 1 914 162 B1 6/2010
EP 1914162 B1 9/2010
(Continued)

OTHER PUBLICATIONS

International Search Report and Written Opinion issued in connection with corresponding PCT Application No. PCT/US2016/059466 dated Feb. 2, 2017.
(Continued)

*Primary Examiner* — Adi Amrany
(74) *Attorney, Agent, or Firm* — GE Global Patent Operation; Nitin Joshi (57) ABSTRACT

A power system for offshore application includes a plurality of power circuits. Each of the power circuit includes an alternating current (AC) bus which supplies power to an auxiliary load and is connected to a generator. The power circuit further includes a first direct current (DC) bus having a first DC voltage supplying power to a first load and a second DC bus having a second DC voltage supplying power to a second load. The power circuit also includes a first DC to DC converter coupled between the first DC bus and the second DC bus, wherein the first DC to DC converter is configured for bidirectional power flow and an AC to DC converter coupled between the AC bus and the first DC bus. The first DC bus of at least one power circuit is coupled to the second DC bus of at least another power circuit with a second DC to DC converter. The system also includes a controller configured to control the operation of the first DC to DC converter, second DC to DC converter and the AC to
(Continued)

DC converter for regulating the first and second DC voltages. The controller is further configured to provide power to the second DC bus from the at least one AC to DC converter during a first operating state and from the first DC to DC converter during a second operating state.

23 Claims, 5 Drawing Sheets (51) Int. Cl.
*H02M 3/04* (2006.01)
*H02M 7/04* (2006.01)
*H02J 3/36* (2006.01)

(58) Field of Classification Search
USPC .......................................................... 307/19
See application file for complete search history.

(56) References Cited

U.S. PATENT DOCUMENTS

| | | | | |
|---|---|---|---|---|
| 6,937,483 | B2* | 8/2005 | Zhu | H02M 3/33576 363/17 |
| 7,057,376 | B2* | 6/2006 | Cook | B60R 16/03 323/207 |
| 7,544,108 | B2 | 6/2009 | Rzadki et al. | |
| 7,701,082 | B2* | 4/2010 | Lazarovich | H02J 5/00 244/58 |
| 7,980,905 | B2* | 7/2011 | Rembach | B63H 21/20 440/6 |
| 8,062,081 | B2 | 11/2011 | Barrett et al. | |
| 8,373,949 | B2 | 2/2013 | Bourgeau | |
| 8,421,270 | B1* | 4/2013 | Miller | H02J 3/02 307/45 |
| 8,425,267 | B2* | 4/2013 | Harpin | B63H 21/17 440/6 |
| 9,197,071 | B2* | 11/2015 | Williams | H02J 3/28 |
| 9,381,990 | B2* | 7/2016 | Settemsdal | B60L 7/14 |
| 9,459,643 | B2* | 10/2016 | Miller | G06F 1/263 |
| 9,667,157 | B1* | 5/2017 | Dong | G01R 19/175 |
| 9,745,038 | B2* | 8/2017 | Lai | B63J 3/00 |
| 9,780,643 | B2* | 10/2017 | Dong | H02M 1/34 |
| 2006/0061213 | A1* | 3/2006 | Michalko | H02J 4/00 307/9.1 |
| 2009/0015063 | A1* | 1/2009 | Michalko | H02J 5/00 307/19 |
| 2009/0195074 | A1* | 8/2009 | Buiel | H02J 3/28 307/48 |
| 2009/0218883 | A1* | 9/2009 | Peterson | B63H 23/24 307/9.1 |
| 2009/0312885 | A1* | 12/2009 | Buiel | H02J 3/32 700/297 |
| 2011/0080040 | A1* | 4/2011 | Kumar | B60K 6/46 307/9.1 |
| 2011/0148209 | A1* | 6/2011 | Williams | H02J 3/32 307/75 |
| 2011/0249472 | A1* | 10/2011 | Jain | H02M 3/33584 363/15 |
| 2011/0254368 | A1* | 10/2011 | Boe | B63H 21/17 307/18 |
| 2011/0298283 | A1* | 12/2011 | Sannino | B63J 3/04 307/38 |
| 2012/0223524 | A1* | 9/2012 | Williams | H02J 3/005 290/50 |
| 2012/0326516 | A1* | 12/2012 | Gurunathan | H02J 1/00 307/72 |
| 2013/0029543 | A1* | 1/2013 | Gjerpe | B63J 3/00 440/1 |
| 2013/0201733 | A1* | 8/2013 | Divan | H02M 1/00 363/39 |
| 2013/0270902 | A1* | 10/2013 | Andersen | H02H 7/26 307/9.1 |
| 2013/0271083 | A1* | 10/2013 | Williams | H02J 3/28 320/128 |
| 2013/0307444 | A1* | 11/2013 | Settemsdal | B60L 7/14 318/139 |
| 2013/0308344 | A1* | 11/2013 | Rosado | H02M 3/33584 363/17 |
| 2013/0313894 | A1* | 11/2013 | Settemsdal | H02J 4/00 307/9.1 |
| 2013/0314950 | A1* | 11/2013 | Hembach | H02M 3/33592 363/17 |
| 2014/0077607 | A1 | 3/2014 | Clarke et al. | |
| 2014/0156101 | A1 | 6/2014 | Miller et al. | |
| 2016/0154046 | A1* | 6/2016 | Dong | G01R 31/025 324/509 |
| 2017/0133852 | A1* | 5/2017 | Macdonald | H02J 3/382 |
| 2017/0298721 | A1* | 10/2017 | Shin | E21B 44/00 |

FOREIGN PATENT DOCUMENTS

| | | |
|---|---|---|
| EP | 2 394 908 B1 | 3/2013 |
| EP | 2394908 B1 | 6/2013 |
| KR | 101305003 B1 | 9/2013 |
| WO | 2012104152 A3 | 9/2012 |
| WO | 2014037583 A2 | 3/2014 |
| WO | 2014177346 A1 | 11/2014 |

OTHER PUBLICATIONS

Jan et al., "Onboard DC-Grid and Energy Management Tools Energy efficient solutions", ABB Marine and Cranes, 37th Annual INTERFERRY Conference Oct. 21-24, 2012—Dubai. Oct. 13, 2012.

D. Mattick et al., "The Electric Ship Technology Demonstrator: Some Results of System Testing," Paper, Proceedings of the 2004 WSEAS Conference, Jul. 12-14, 2004.

* cited by examiner

POWER SYSTEM FOR OFFSHORE APPLICATIONS

BACKGROUND

Embodiments of the invention relate generally to power system architecture and more specifically to a power system for offshore applications.

Offshore applications such as offshore oil and gas exploration/production and offshore wind power and marine transport have become very prevalent in last few years. For example, in the last few decades, marine traffic has increased substantially across the world due to tremendous rise in cargo transport vessels, warships, offshore oil ships, passenger ships etc. These vessels or ships have many electrical loads on board. Variable speed electric drives for pumps, fans, electric propulsion installations, lighting and air conditioning are some examples of the electrical loads on board of a ship. The electrical loads operate at various different voltages and frequencies, and thus need separate electric power supplies.

Most of the ships use alternating current (AC) power system architecture. However, more recently some ships are using DC power system architecture including energy storage devices or electrical generators to meet the demands of the plurality of electrical loads. If a load needs alternating current (AC) power supply, the DC power may be converted into AC power with help of power electronic converters. Generally, a plurality of generators supply power to a plurality of DC buses which in turn supply power to a particular electrical load. There are examples where a single DC bus can also provide power to the entire ship electrical load.

Challenges with conventional power system include integration of multiple DC buses with different voltage levels, isolating the faults in the DC power system in a very short time and integrating the various energy storage devices and generators. For these and other reasons, there is a need for the present power system for marine applications.

BRIEF DESCRIPTION

A power system for offshore application is provided. The power system includes a plurality of power circuits each having an alternating current (AC) bus connected to a generator and supplying power to an auxiliary load. Each of the power circuits further includes a first direct current (DC) bus having a first DC voltage supplying power to a first load and a second DC bus having a second DC voltage supplying power to a second load. The power circuit also includes a first DC to DC converter coupled between the first DC bus and the second DC bus, wherein the first DC to DC converter is configured for bidirectional power flow and an AC to DC converter coupled between the AC bus and the first DC bus. The first DC bus of at least one power circuit is coupled to the second DC bus of at least another power circuit with a second DC to DC converter. The power system also includes a controller configured to control the operation of the first DC to DC converter, second DC to DC converter and the AC to DC converter for regulating the first and second DC voltages, wherein the controller is further configured to provide power to the second DC bus from the at least one AC to DC converter during a first operating state and from the first DC to DC converter during a second operating state.

A method of providing power to offshore application includes providing power to a plurality of power circuits. The step of providing power to each power circuit includes supplying power to an auxiliary load from an alternating current (AC) bus connected to a generator and supplying power to a first load from a first direct current (DC) bus having a first DC voltage. The step of providing power to each power circuit further includes providing power to a second load from a second DC bus having a second DC voltage and connecting a first DC to DC converter coupled between the first DC bus and the second DC bus, wherein the first DC to DC converter is configured for bidirectional power flow. The step of providing power to each power circuit also includes connecting an AC to DC converter between the AC bus and the first DC bus. The method also includes coupling the first DC bus of at least one power circuit to the second DC bus of at least another power circuit with a second DC to DC converter and regulating the first and second DC voltages by controlling the operation of the first DC to DC converter, the second DC to DC converter and the AC to DC converter. The method further includes providing power to the second DC bus from the at least one AC to DC converter during a first operating state and from the first DC to DC converter during a second operating state.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings. The connections may include direct connections. Furthermore, the terms "circuit" and "circuitry" and "controller" may include either a single component or a plurality of components, which are either active and/or passive and are connected or otherwise coupled together to provide the described function.

Figure 1:
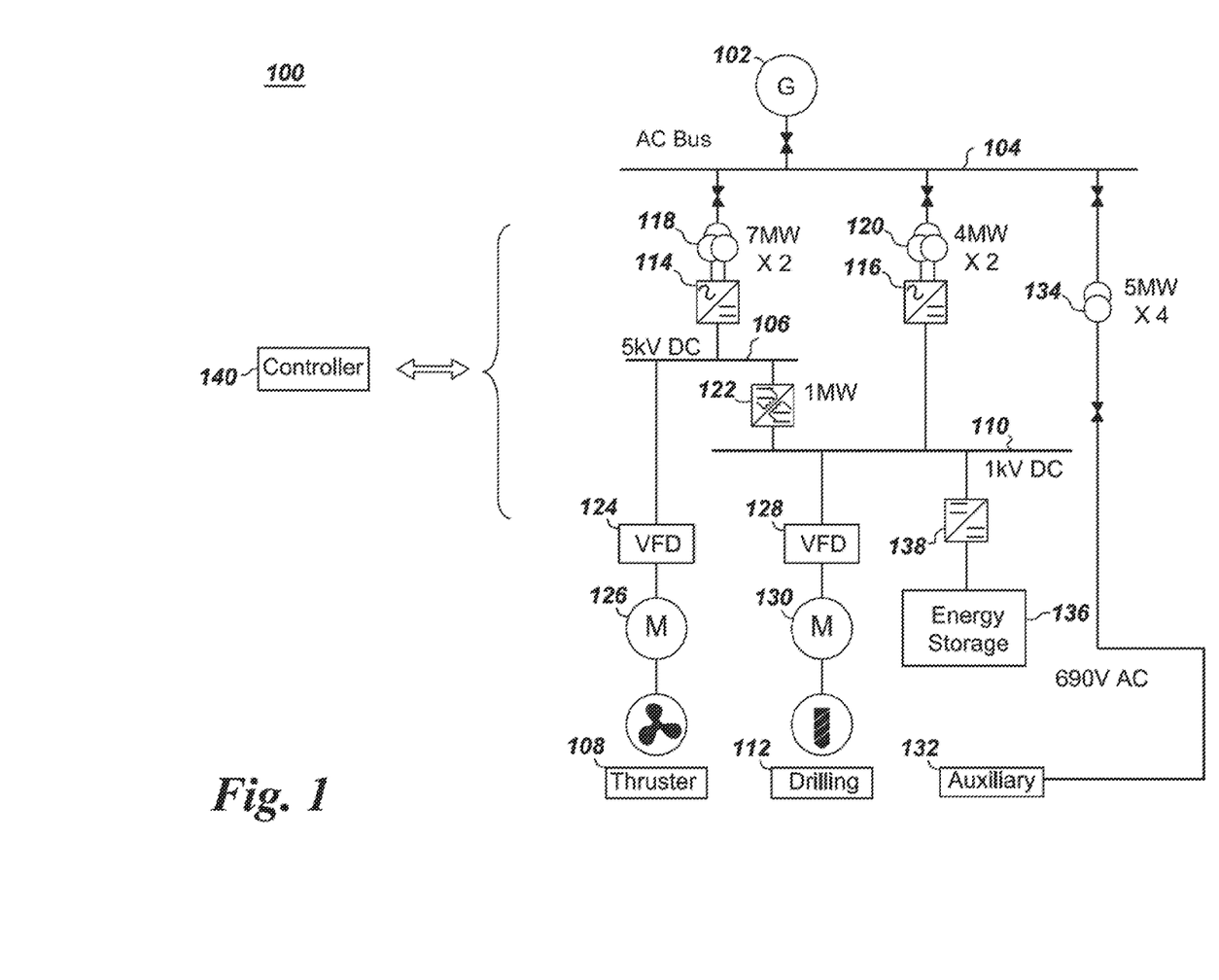
FIG. 1 is a diagrammatical representation of a power system for a marine ship, according to aspects of the present disclosure.

Turning now to the drawings, by way of example in FIG. 1, a power system 100 for a marine ship is depicted. In one embodiment, the power system 100 includes a generator 102 coupled to an alternating current (AC) bus 104. The generator 102 includes an AC generator which generates AC power for the marine ship. The AC bus 104 supplies power to an auxiliary load 132 via a transformer 134. The auxiliary load 132 may operate at lower voltage compared to the AC voltage of the AC bus 104. Therefore, the transformer 134 reduces the AC voltage of the AC bus to the level suitable for the auxiliary load 132. In one embodiment, the auxiliary load may include service load.

The power system 100 further includes a first direct current (DC) bus 106 having a first DC voltage to supply power to a first load 108. Further, a second DC bus 110 having a second DC voltage supplies power to a second load 112. The AC bus 104 supplies power to the first and second DC buses 106, 110. The first load 108 may include a Thruster load and the second load 112 may include a drilling load. In one embodiment, the second DC voltage is lower than the first DC voltage. The first load 108 may be operated and controlled by a variable frequency drive 124 which controls a first load motor 126. Similarly, the second load 112 may also be operated and controlled by another variable frequency drive 128 which controls a second load motor 130.

Furthermore, a first AC to DC converter 114 couples the AC bus 104 and the first DC bus 106. Similarly, a second AC to DC converter 116 couples the AC bus 104 and the second DC bus 110. In one embodiment, transformers 118 and 120 are connected between the AC bus 104 and first and second AC to DC converters 114, 116 respectively to reduce the AC voltage level of the AC bus 104 that is supplied to AC to DC converters 114, 116. It should be noted that if in one embodiment, the AC voltage level matches the voltage of AC to DC converters 114, 116 then the AC bus 104 can be directly connected to the AC to DC converters without transformers.

A first DC to DC converter 122 is coupled between the first DC bus 106 and the second DC bus 110. The first DC to DC converter 122 includes a bidirectional converter and can transfer power either from first DC bus 106 to second DC bus 110 or vice versa. Furthermore, the DC to DC converter 122 includes a high frequency DC to DC converter.

In one embodiment, an energy storage device 136 may be coupled to the second DC bus 110 via a power electronic converter 138 to supply DC power to the second DC bus 110. In another embodiment, the energy storage device 136 may be coupled to the first DC bus 106. In yet another embodiment, energy storage devices may be coupled to both the first DC bus 106 and the second DC bus 110. Further, in some embodiments, energy storage may not be utilized or connected to any of the first or second DC buses 106, 110. The power electronic converter 138 may be utilized to match the voltages of energy storage device and the DC bus 110.

Power System 100 further includes a controller 140 to control the operation of AC to DC converters 114, 116, DC to DC converter 122 and other elements of the power system 100. It should be noted that even though a single controller 140 is shown in the embodiment of FIG. 1, in other embodiments controller 140 may be split into a plurality of controllers and each individual controller may control a part of the power system 140. Power system 100 may also include passive devices such as fuses and/or circuit breakers (not shown) to protect a second of the power system 100 during a fault (e.g., short circuit fault).

In one embodiment, the objective is to provide improved availability of power supply to first and second load. In a first operating state controller 140 controls second AC to DC converter 116 to provide power to second DC bus 110. However, in a second operating state (which is initiated when a fault is detected on the second AC to DC converter 116 or the feeder and transformer 120 that feed power to it), controller 140 controls DC to DC converter 122 in such a way that the power to second load 112 is supplied from first DC bus 106 and energy storage 136. Thus, the second load 112 receives the power uninterrupted. Similarly, when there is a fault on transformer 118 or AC to DC converter 114, controller 140 controls DC to DC converter 122 to provide power to first load 108 from second DC bus 110. This way, even the energy storage 136 can be shared among first load 108 and second load 112. Further, during normal operation, controller 140 controls AC to DC converter 114 and DC to DC converter 122 to regulate the first voltage of the first DC bus 106. Similarly, during normal operation, controller 140 controls AC to DC converter 116, DC to DC converter 122 and power electronic converter 138 to regulate the second voltage of the second DC bus 110. In one embodiment, the voltage of the AC bus 104 may be 11 kV AC, the first voltage may be 5 kV DC and the second voltage may be 1 kV DC.

It should be noted that FIG. 1, is a single line diagram of DC power system 100. In other words, converters 122, 138 have been shown to have only one DC input terminal and one DC output terminal for ease of explanation. However, a negative terminal or a reference terminal is always there at the input and the output of converters 122, 138. Similarly, DC buses 106, 110 include a positive rail and a negative rail but for ease of explanation only one line is shown.

Figure 2:
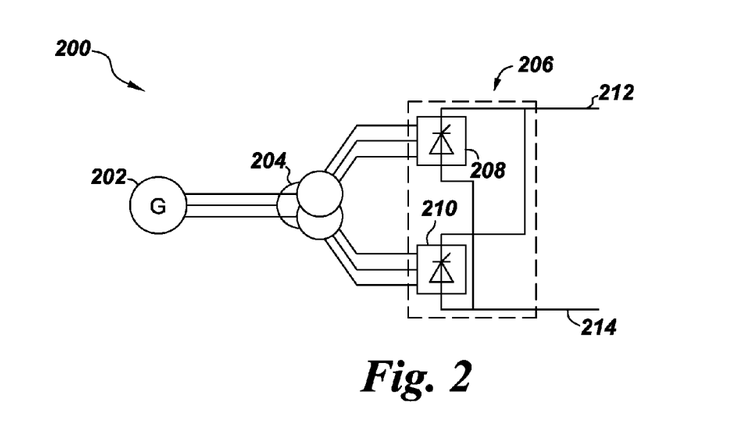
FIG. 2 is a diagrammatical representation of a section of the power system of FIG. 1, according to aspects of the present disclosure.

FIG. 2 shows a section 200 of the power system 100 of FIG. 1. The section 200 shows a generator 202, a transformer 204 and a first AC to DC converter 206. The first DC bus 101 of FIG. 1 is represented here by a positive bus 212 and a negative bus 214. The generator 202 is a three phase AC generator which supplies power to transformer 204. The transformer 204 includes one primary winding connected to the generator 202 and two secondary windings connected to the first AC to DC converter 206 as shown. The first AC to DC converter 206 includes a 12 pulse thyristor rectifier having two three phase thyristor bridges 208, 210 connected in parallel on the output side. In another embodiment, first AC to DC converter 206 may be a diode rectifier instead of the thyristor rectifier. In one embodiment, the three phase generator 202 and transformer 204 may be replaced with a six phase generator which supplies power directly to the first AC to DC converter 206.

Figure 3:
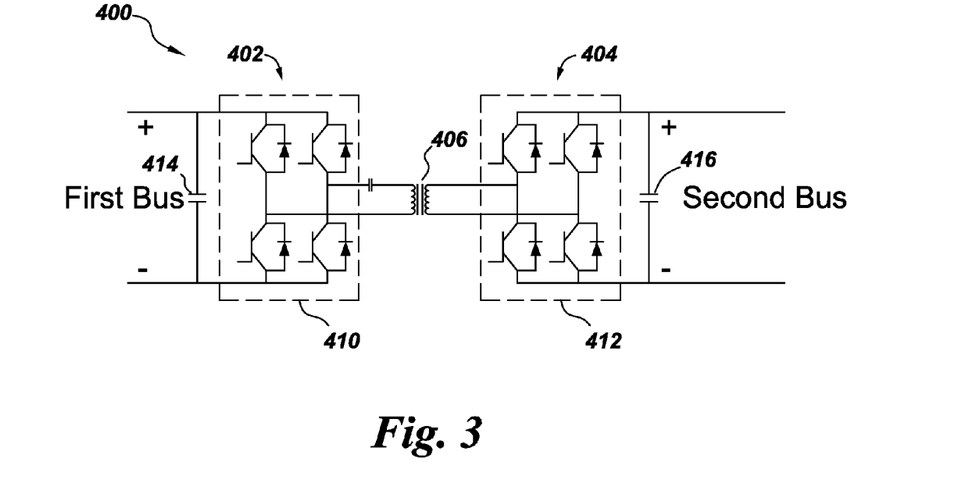
FIG. 3 is a detailed view of a DC to DC converter of FIG. 1, according to aspects of the present disclosure.

FIG. 3 shows a detailed view of a DC to DC converter 400 such as DC to DC converter 122 of FIG. 1, in accordance with an embodiment of the present technique. DC to DC converter 400 may be a high frequency (e.g., 500 Hz to 100 kHz) converter. In the embodiment shown, DC to DC converter 400 is connected between a first bus (e.g., bus 106 of FIG. 1) and a second bus (e.g., bus 110 of FIG. 1) and includes a DC to high frequency AC conversion stage followed by a high frequency AC to DC conversion stage. DC to DC converter 400 is a bidirectional converter, i.e., DC to DC converter 400 allows power transfer from the first bus to the second bus and vice versa. Specifically, DC to DC converter 400 includes a first bus converter 402 and a second bus converter 404. First bus converter 402 and second bus converter 404 are coupled to each other via a high or medium frequency transformer 406. First bus converter 402 and second bus converter 404 both include full bridge IGBT converters 410, 412 and capacitors 414, 416 on one of their sides as shown.

In operation, if the power needs to be transferred from the first bus to second bus then first bus converter 402 will act as a DC to high frequency AC converter and second bus converter 404 will act as a high frequency AC to DC converter. In this case, first bus converter 402 converts input DC voltage into medium/high frequency AC voltage and second bus converter 404 converts medium/high frequency AC voltage into DC voltage. Similarly, if the power needs to be transferred from the second bus to the first bus then second bus converter 404 will act as a DC to high frequency AC converter and first bus converter 402 will act as an high frequency AC to DC converter. Transformer 406 provides a coupling between AC connections of first bus converter 402 and AC connections of second bus converter 404. In one embodiment, the IGBTs in each of converter 410 and 412 may include series connected switching modules.

Figure 4:
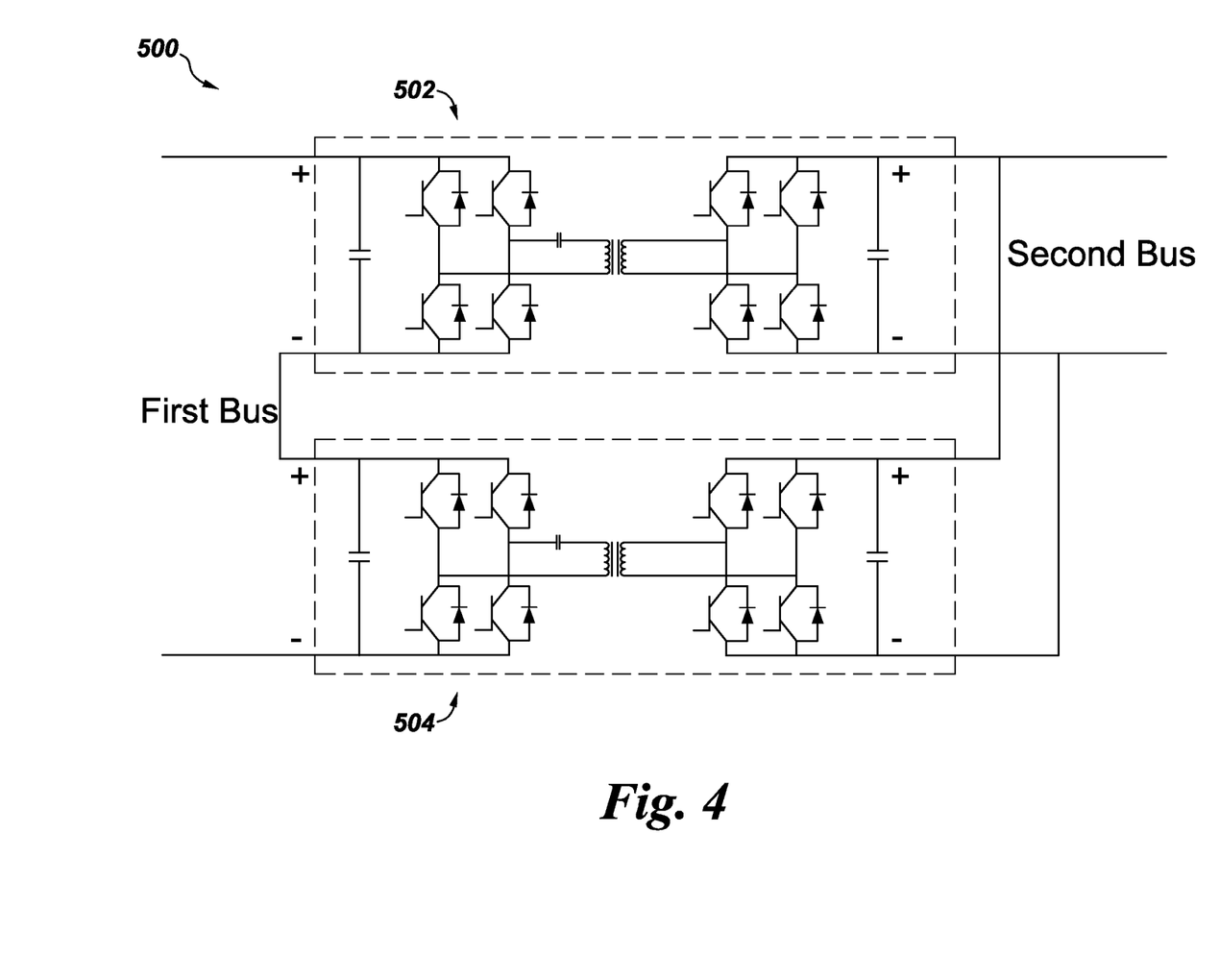
FIG. 4 is a detailed view of another embodiment of a DC to DC converter of FIG. 1, according to aspects of the present disclosure.

FIG. 4 shows a detailed view of another embodiment of a DC to DC converter 500 such as DC to DC converter 122 of FIG. 1. In the embodiment shown, DC to DC converter 500 utilizes a plurality of DC to DC converters 502, 504 such as converter 400 of FIG. 3 which are connected in series on first bus side and in parallel on second bus side. The advantage of this embodiment is that it can provide higher voltage on first bus side and can provide higher current on second bus side. In alternative embodiments, converter 502, 504 can be connected in series or parallel on both sides as per the voltage, current or power requirements.

Figure 5:
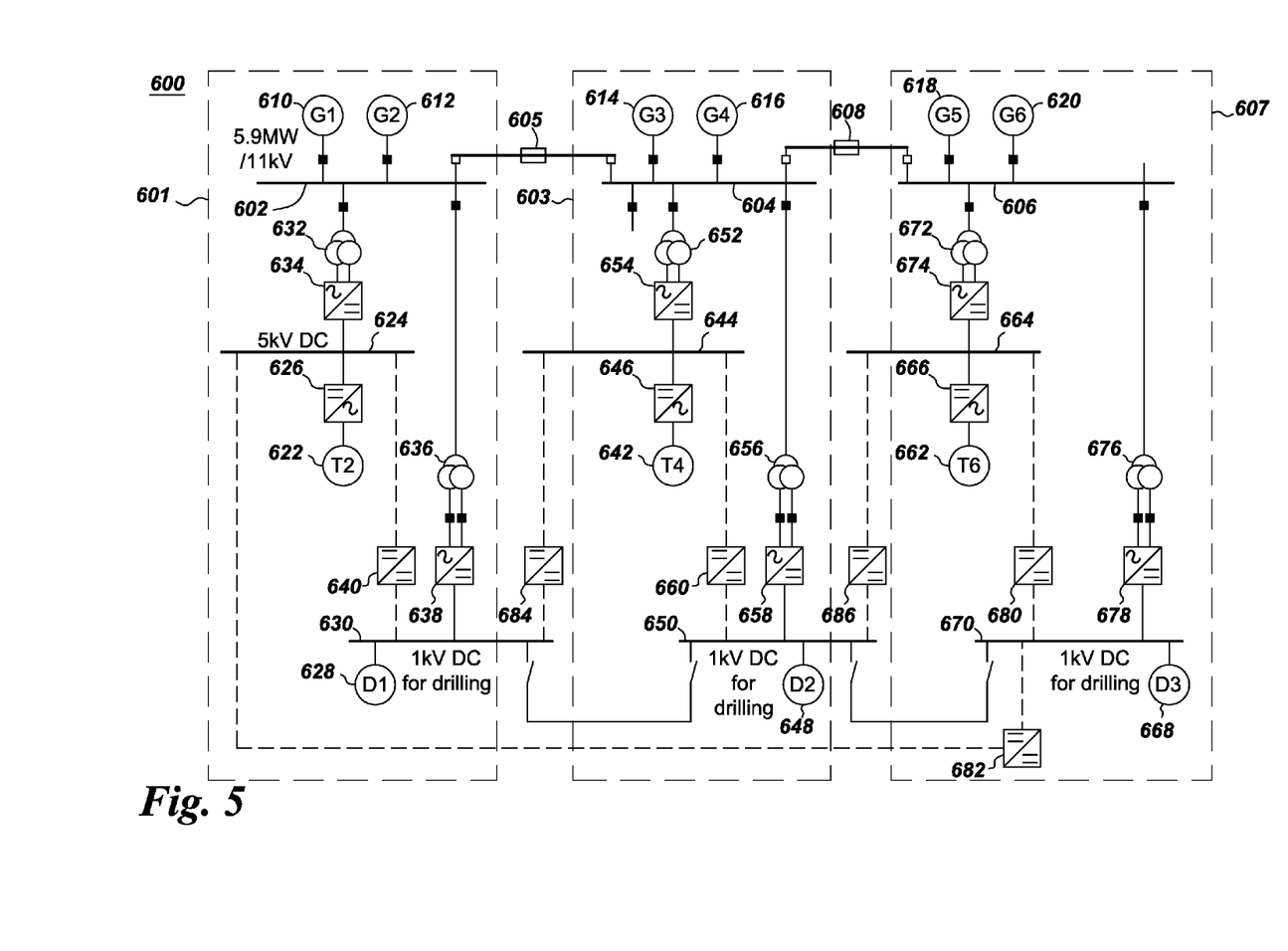
FIG. 5 is a diagrammatical representation of another power system for a marine ship, according to aspects of the present disclosure.

FIG. 5 shows another power system 600 for a marine ship in accordance with an embodiment of the present technique. Power system 600 includes three AC buses 602, 604, 606 and respective power circuits 601, 603, 607. AC buses 602 and 604 are connected to each other by a circuit breaker 605 and AC buses 604 and 606 are connected to each other by another circuit breaker 608. The power to AC bus 602 is supplied by two generators 610, 612 and the power to AC bus 604 is supplied by generators 614, 616. Similarly, power to AC bus 606 is supplied by generators 618, 620.

Circuit breakers 605 and 608 are normally open and are closed in the event of a fault on generators of any one of the AC buses to which they are connected. For example, in case of a fault on generators 610 or 612, circuit breaker 605 may be closed (i.e., switched on) so that generators 614 and 616 can supply power to the AC bus 602. It should be noted that this is only one alternative and in case of requirement of complete isolation between AC buses 602 and 604, power may be supplied to loads 622, 628 of AC bus via connection between DC buses 630 and 644 or DC buses 630 and 650. As the DC buses are tied to each other, the load transient on any one AC bus is shared by all three AC buses and thus, the load transient on the system is improved.

Power circuit 601 includes AC bus 602, first DC bus 624 and second DC bus 630 and related circuitry. AC bus 602 supplies power to a thruster load 622 via a first DC bus 624 and a variable frequency drive 626. Further, AC bus 602 supplies power to a drilling load 628 via a second DC bus 630. AC bus 602 and first DC bus 624 are coupled to each other by a transformer 632 and an AC to DC converter 634. Similarly, AC bus 602 and second DC bus 630 are coupled to each other by another transformer 636 and another AC to DC converter 638. First DC bus 624 and second DC bus 630 are also connected to each other by a DC to DC converter 640. It should be noted in one embodiment, that second DC bus 630 may also be connected to the AC bus 604 or 606 of power circuits 603, 607 instead of AC bus 602 of the same power circuit.

Similarly, power circuit 603 includes AC bus 604, first DC bus 644 and second DC bus 650 and related circuitry. AC bus 604 supplies power to a thruster load 642 via a first DC bus 644 and a variable frequency drive 646. Further, AC bus 604 supplies power to a drilling load 648 via a second DC bus 650. AC bus 604 and first DC bus 644 are coupled to each other by a transformer 652 and an AC to DC converter 654. Similarly, AC bus 604 and second DC bus 650 are coupled to each other by another transformer 656 and another AC to DC converter 658. First DC bus 644 and second DC bus 650 are also connected to each other by a DC to DC converter 660.

Further, power circuit 607 includes AC bus 606, first DC bus 664 and second DC bus 670 and related circuitry. AC bus 606 supplies power to a thruster load 662 via a first DC bus 664 and a variable frequency drive 666. Further, AC bus 606 supplies power to a drilling load 668 via a second DC bus 670. AC bus 606 and first DC bus 664 are coupled to each other by a transformer 672 and an AC to DC converter 674. Similarly, AC bus 606 and second DC bus 670 are coupled to each other by another transformer 676 and another AC to DC converter 678. First DC bus 664 and second DC bus 670 are also connected to each other by a DC to DC converter 680.

It should be noted that DC to DC converters 640, 660 and 680 operate similar to DC to DC converter 122 of FIG. 1. Further, the drilling loads 628, 648, 668 may include a plurality of motors. Furthermore, the second DC buses 630, 650, 670 of power circuits 601, 603, 607 are connected to each other by circuit breakers which are normally open and in an embodiment, may closed in the event of supplying power from one DC bus to another DC bus. Further, power circuits 601, 603, 607 are coupled to each other by DC to DC converters 682, 684 and 686 (also referred to as second DC to DC converters). First DC bus 624 is connected to second DC bus 670 by DC to DC converter 682 and first DC bus 644 is connected to second DC bus 630 by another DC to DC converter 684. Similarly, first DC bus 664 is connected to second DC bus 650 by yet another DC to DC converter 686. DC to DC converters 682, 684 and 686 provide additional flexibility for transferring power from one DC bus to another DC bus in case a fault in the system which blocks power to a particular DC bus from its normal operation power source.

DC to DC converters 682, 684 and 686 include the DC to DC converter similar to the converter 400 shown in FIG. 3. As DC to DC converter 400 includes a transformer, the DC to DC converters 682, 684 and 686 also include a transformer and thus, the converters 682, 684 and 686 provide galvanic isolation between power circuits 601, 603 and 607 when the circuit breakers between DC buses 630, 650 and 670 and circuit breakers 605, 608 are always kept open.

In one embodiment, controller 140 (FIG. 1) may control any of the first DC to DC converters 640, 660, 680 and second DC to DC converters 682, 684, 686 in such a way so as to block propagation of a fault from faulty DC bus to a non-faulty DC bus. For example, if there is a fault on first DC bus 624 and second DC bus 630 is healthy or non-faulty, then controller 140 may operate first DC to DC converter 640 in a current control mode and block the propagation of the fault from first DC bus 624 to second DC bus 630.

Figure 6:
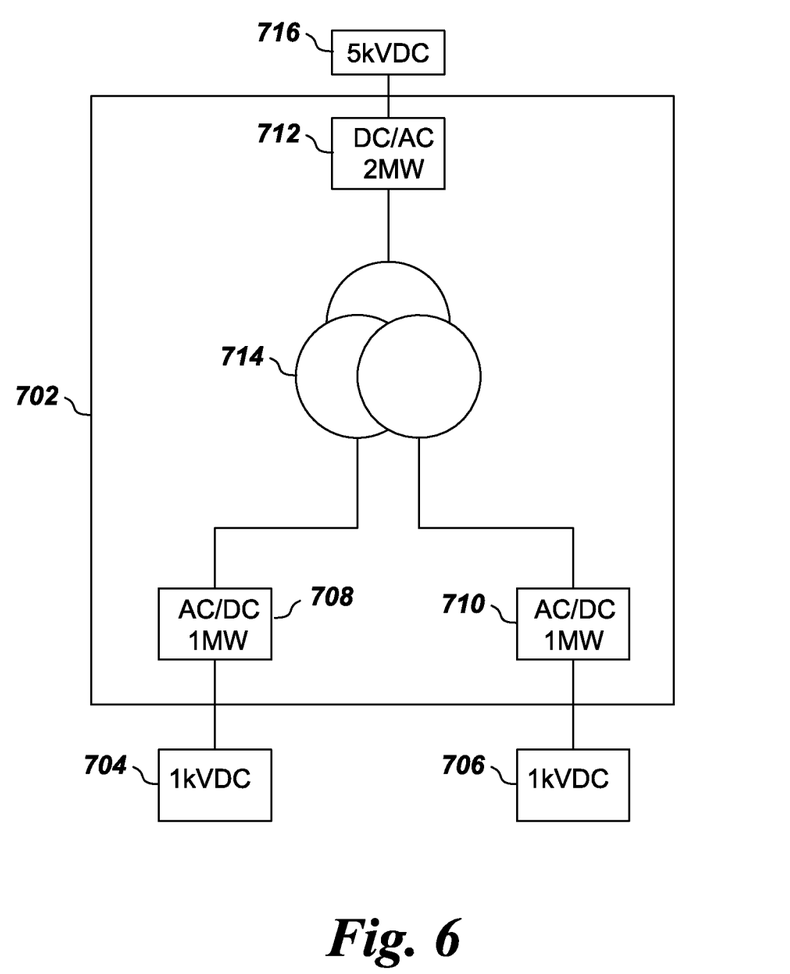
FIG. 6 is a diagrammatical representation of a section of the power system of FIG. 5, according to aspects of the present disclosure.

FIG. 6 shows a section 700 of the power system 600 of FIG. 5. In one embodiment, each of the first DC to DC converters 640, 660, 680 (FIG. 5) may be combined with each of the second DC to DC converters 682, 684, 686 (FIG.

5) to form a third DC to DC converter 702 as shown in FIG. 6. The section 700 shows two second DC buses 704, 706 of two different power circuits. The two DC buses 704, 706 of two different power circuits are fed by third DC to DC converter 702. DC to DC converter 702 includes a DC to high frequency AC converter 712, a high frequency transformer 714 and two high frequency AC to DC converters 708, 710. It should be noted that DC to high frequency AC converter 712, high frequency transformer 714 and high frequency AC to DC converter 708 form a first DC to DC converter and DC to high frequency AC converter 712, the high frequency transformer 714 and high frequency AC to DC converters 710 form a second DC to DC converter. High frequency AC to DC converters 708, 710 receive power from high frequency transformer 714 which in turn receive power from DC to high frequency AC converter 712. High frequency AC to DC converters 708, 710 then supply power to second DC buses 704, 706 respectively. Further, DC to high frequency AC converter 712 is connected to first bus 716 of one power circuit. As can be seen by combining first and second DC to DC converters, one DC to high frequency AC converter and one high frequency transformer of one of the DC to DC converter may be eliminated and the other high frequency transformer may be provided with two secondary windings. The rating of the DC to high frequency AC converter may also be kept same if two connections between first and second DC buses are only intended for loss of main feed events.

One of the advantages of the present technique is since power circuits 601, 603 and 607 may be galvanic ally isolated, the short circuit capability of each power circuit may be limited to its own circuit. In other words, power circuits 601, 603, 607 need not be protected for a higher short circuit current even though there is coupling between them and they share power among themselves. Other advantages of the present technique include improved power availability for drilling and thruster loads. Further, when one energy storage device is utilized in the system, it can be shared between both drilling and thruster loads. The connection between multiple AC buses also improves the load transient on the system. Another advantage of the present technique is it enables reserve generator sharing and since the generators may be shared, less number of engines needs to be running online.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system for offshore application, comprising:
   a plurality of power circuits, each comprising:
   an alternating current (AC) bus connected to a generator and supplying power to an auxiliary load;
   a first direct current (DC) bus having a first DC voltage supplying power to a first load;
   a second DC bus having a second DC voltage supplying power to a second load;
   a first DC to DC converter coupled between the first DC bus and the second DC bus, wherein the first DC to DC converter is configured for bidirectional power flow;
   a first AC to DC converter coupled between the AC bus and the first DC bus;
   a second AC to DC converter coupled between the second DC bus and the AC bus of the same power circuit or another power circuit;
   wherein the first DC bus of at least one power circuit is coupled to the second DC bus of at least another power circuit with a second DC to DC converter;
   a controller configured to control the operation of the first DC to DC converter, second DC to DC converter and the AC to DC converter for regulating the first and second DC voltages;
   wherein the controller is further configured to provide power to the second DC bus from the second AC to DC converter during a first operating state and from the first DC to DC converter during a second operating state; and
   wherein the first DC to DC converter is different than the second DC to DC converter.

2. The power system of claim 1, wherein the first load includes a thruster load and the second load includes drilling load.

3. The power system of claim 2 further comprising a first electrical drive connected between the first DC bus and the thruster load to control a thruster load motor.

4. The power system of claim 3 further comprising a second electrical drive connected between the second DC bus and the drilling load to control a drilling load motor.

5. The power system of claim 1, wherein the second operating condition is initiated when a fault is detected on the second AC to DC converter or a feeder and a transformer that feed power to the second AC to DC converter.

6. The power system of claim 1, wherein the controller is configured to provide power to the first DC bus from the second DC bus when a fault on first AC to DC converter is detected.

7. The power system of claim 1, wherein the at least one DC to DC converter comprises a high frequency DC to DC converter or medium frequency DC to DC converter.

8. The power system of claim 7, wherein the high frequency DC to DC or medium frequency DC to DC converter includes a first bus converter coupled to a second bus converter via a high frequency transformer or a medium frequency converter.

9. The power system of claim 8, wherein the first bus converter and the second bus converter include full bridge IGBT converters.

10. The power system of claim 7, wherein the at least one DC to DC converter includes a single DC to DC converter or a plurality of DC to DC converters connected in series or in parallel or any combination therein.

11. The power system of claim 1, wherein the AC buses of plurality of power circuits are coupled to each other via circuit breakers.

12. The power system of claim 1, wherein the first DC voltage is higher than the second DC voltage.

13. The power system of claim 1 further comprising at least one energy storage device coupled to one of the first DC bus or second DC bus via a power electronic converter.

14. The power system of claim 1, wherein the first DC to DC converter and the second DC to DC converter are part of a third DC to DC converter having a high frequency transformer connected between a DC to high frequency AC converter and two high frequency AC to DC converters.

15. The power system of claim 1, wherein the second DC buses of the plurality of power circuits are different from one another.

16. The power system of claim 15, wherein the first DC buses of the plurality of power circuits are different from one another.

17. A method of providing power to offshore application comprising:
provide power to a plurality of power circuits, wherein providing power to each power circuit includes:
supplying power to an auxiliary load from an alternating current (AC) bus connected to a generator,
supplying power to a first load from a first direct current (DC) bus having a first DC voltage;
providing power to a second load from a second DC bus having a second DC voltage;
connecting a first DC to DC converter coupled between the first DC bus and the second DC bus, wherein the first DC to DC converter is configured for bidirectional power flow;
connecting a first AC to DC converter between the AC bus and the first DC bus;
coupling a second AC to DC converter between the second DC bus and the AC bus of the same power circuit or another power circuit;
coupling the first DC bus of at least one power circuit to the second DC bus of at least another power circuit with a second DC to DC converter;
regulating the first and second DC voltages by controlling the operation of the first DC to DC converter, the second DC to DC converter and the AC to DC converter;

providing power to the second DC bus from the second AC to DC converter during a first operating state and from the first DC to DC converter during a second operating state; and
wherein the first DC to DC converter is different than the second DC to DC converter.

18. The method of claim 17, wherein the second operating condition is initiated when a fault is detected on the second AC to DC converter or a feeder and a transformer that feed power to the second AC to DC converter.

19. The method of claim 17, further comprising providing power to the first DC bus from the second DC bus when a fault on first AC to DC converter is detected.

20. The method of claim 17, wherein the at least one DC to DC converter comprises a high frequency DC to DC converter or medium frequency DC to DC converter.

21. The method of claim 20, wherein the high frequency DC to DC or medium frequency DC to DC converter includes a first bus converter coupled to a second bus converter via a high frequency transformer or a medium frequency converter.

22. The method of claim 21, wherein the each of the first and the second bus converter include a single DC to DC converter or a plurality of DC to DC converters connected in series or in parallel or any combination therein.

23. The method of claim 17, wherein the first DC to DC converter and the second DC to DC converter are part of a third DC to DC converter having a high frequency transformer connected between a DC to high frequency AC converter and two high frequency AC to DC converters.

* * * * *